US009561549B2

(12) United States Patent
Fraese et al.

(10) Patent No.: US 9,561,549 B2
(45) Date of Patent: Feb. 7, 2017

(54) DRILLING TOOL (71) Applicant: Kennametal, Inc., Latrobe, PA (US)

(72) Inventors: Alex Fraese, Hagenbuechach (DE);
Holger Herdegen, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 414 days.

(21) Appl. No.: 13/942,970

(22) Filed: Jul. 16, 2013

(65) Prior Publication Data
US 2014/0017019 A1 Jan. 16, 2014

(30) Foreign Application Priority Data

Jul. 16, 2012 (DE) .......................... 10 2012 212 440

(51) Int. Cl.
B23B 51/00 (2006.01)
B23P 13/04 (2006.01)
B23B 51/04 (2006.01)

(52) U.S. Cl.
CPC ......... *B23B 51/048* (2013.01); *B23B 51/0493* (2013.01); *B23B 2251/04* (2013.01); *B23B 2251/50* (2013.01); *Y10T 408/03* (2015.01); *Y10T 408/45* (2015.01); *Y10T 408/9095* (2015.01); *Y10T 408/9098* (2015.01)

(58) Field of Classification Search
CPC ............... B23B 51/048; B23B 51/0493; B23B 2251/04; B23B 2251/50; B23B 2251/14; Y10T 29/49995; Y10T 29/49996; Y10T 29/5107
USPC ............... 408/230, 227, 229, 231, 232, 233, 59,408/223, 224, 225; 29/26 A
See application file for complete search history.

(56) References Cited

U.S. PATENT DOCUMENTS

| 4,026,372 A | * | 5/1977 | Hampson | ................ E21B 10/58 175/419 |
| 4,340,327 A | | 7/1982 | Martins | |
| 5,273,380 A | * | 12/1993 | Musacchia | .............. B23B 51/02 408/227 |
| 5,425,604 A | * | 6/1995 | Scheer | .................. B23B 51/048 408/201 |
| 5,704,740 A | * | 1/1998 | Ebenhoch | ........... B23B 51/0493 408/224 |

(Continued)

FOREIGN PATENT DOCUMENTS

| CA | 2515836 A1 * | 2/2006 | ............. E21B 10/46 |
| DE | 8312364 | 9/1983 | |

(Continued)

OTHER PUBLICATIONS

Machine English translation of EP 1627703.*

*Primary Examiner* — Essama Omgba
(74) *Attorney, Agent, or Firm* — Ian K. Sarnways (57) ABSTRACT A drilling tool for machining structural components made of a titanium alloy includes: a support, which extends along an axis of rotation in the axial direction, the support having an end face with a receptacle disposed centrally therein; a plurality of cutting inserts inserted at the end face in a manner that forms a flat drill, each cutting insert having an active insert cutting edge extending transversely to the axial direction; and a drilling tip disposed in the receptacle and having at least two tip cutting edges, the tip cutting edges extending outward from the axis of rotation and being adjoined in each case by at least one active insert cutting edge.

22 Claims, 4 Drawing Sheets (56) References Cited

U.S. PATENT DOCUMENTS

| | | | | |
|---|---|---|---|---|
| 5,947,653 | A * | 9/1999 | Hamberg | 408/59 |
| 5,957,635 | A * | 9/1999 | Nuzzi et al. | 408/231 |
| 6,000,887 | A * | 12/1999 | Hoefler | B23B 51/0493 |
| | | | | 408/229 |
| 6,030,155 | A * | 2/2000 | Scheer | B23B 51/02 |
| | | | | 408/223 |
| 7,108,460 | B2 * | 9/2006 | Chang | B23B 27/145 |
| | | | | 408/223 |
| 7,140,815 | B2 * | 11/2006 | George | B23B 51/02 |
| | | | | 408/227 |
| 7,244,081 | B2 * | 7/2007 | Johnson | B23B 31/1075 |
| | | | | 408/144 |
| 7,572,088 | B2 * | 8/2009 | Biscay | B23B 51/048 |
| | | | | 408/225 |
| 7,575,400 | B2 * | 8/2009 | Kruszynski et al. | 408/57 |
| 7,832,966 | B2 * | 11/2010 | Shultz | B23B 51/02 |
| | | | | 408/224 |
| 8,376,669 | B2 * | 2/2013 | Jaeger et al. | 408/231 |
| 8,517,644 | B2 * | 8/2013 | Meyer | B23B 51/00 |
| | | | | 408/224 |
| 8,647,024 | B2 * | 2/2014 | Saji | 407/48 |
| 8,944,727 | B2 * | 2/2015 | Nitzsche | B23B 51/0493 |
| | | | | 408/230 |
| 9,004,827 | B2 * | 4/2015 | Meyer | 408/224 |
| 2004/0091329 | A1 * | 5/2004 | Chang | B23B 27/145 |
| | | | | 408/233 |
| 2006/0037783 | A1 * | 2/2006 | Biscay | B23B 51/048 |
| | | | | 175/57 |
| 2006/0110227 | A1 * | 5/2006 | Kruszynski et al. | 408/230 |
| 2007/0036621 | A1 * | 2/2007 | Frank | 408/227 |
| 2009/0044986 | A1 * | 2/2009 | Jaeger et al. | 175/418 |
| 2010/0086371 | A1 * | 4/2010 | Mergenthaler | 408/59 |
| 2010/0183384 | A1 * | 7/2010 | Kruszynski | B23D 77/02 |
| | | | | 407/67 |
| 2012/0201618 | A1 * | 8/2012 | Jager | 408/200 |
| 2013/0330143 | A1 * | 12/2013 | Meyer et al. | 408/229 |

FOREIGN PATENT DOCUMENTS

| | | | | |
|---|---|---|---|---|
| DE | 19710996 | A1 | | 9/1998 |
| DE | 102011082732 | A1 * | 3/2013 | B23B 51/00 |
| EP | 1512476 | A2 * | 3/2005 | B23B 51/02 |
| EP | 1627703 | A1 * | 2/2006 | B23B 51/04 |
| JP | 2011177833 | A * | 9/2011 | |
| WO | 96/11079 | A1 | | 4/1996 |

* cited by examiner

DRILLING TOOL

BACKGROUND

Field of the Invention

The present invention relates to drilling tools and, more particularly to drilling tools for machining structural components made of a titanium alloy. The invention further relates to a machining process for machining structural components made of titanium alloy.

Background Information

On account of its special properties, the material titanium, or alloys thereof, is commonly used in particular, for example, in the field of aircraft construction and there for what are known as structural components, i.e., for components which in particular take on a supporting function and are exposed to certain mechanical loading. In particular, these structural components also serve for mounting rotating parts, for example axles.

Structural components of this type are manufactured as forged components and have a frame-like structure, with pockets having a pocket base which connects individual frame webs being formed between the individual frame webs. On account of the formation as a forged part, post-machining is also required after the forging in order to form the pockets in the desired geometry. Specifically, on account of the forging operation, the pockets initially have a curved surface geometry which is not precisely defined.

For machining the pockets, provision is made nowadays of a two-stage process, in which firstly a blind hole is pre-drilled by means of a flat drilling tool and then the pocket is milled out with the desired shaping with the aid of a (roughing) milling cutter, in such a manner that a flat, planar pocket base remains.

Figure 8:
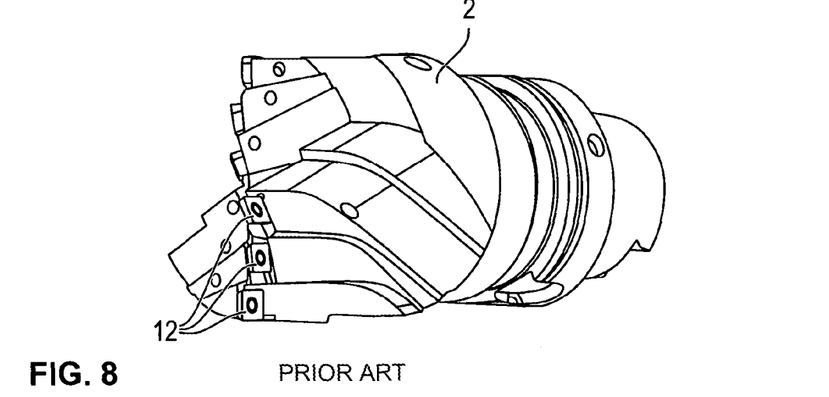
FIG. 8 shows a conventional drilling tool according to the prior art.

At present, the flat drilling tool used for this purpose is a modular drilling tool having support and cutting inserts fitted thereto at the end, as illustrated by way of example in FIG. 8. Here, a plurality of cutting inserts are arranged in two rows of inserts rotationally offset in relation to one another in particular by 180°. To form a flat drill, the insert cutting edges of the cutting inserts each run in a common plane in the horizontal direction, i.e., perpendicular to the axis of rotation, in order to produce a flat drilled base. The cutting inserts in each row of inserts are spaced apart from one another in the radial direction to form a gap, which is overlapped in each case by a cutting insert from the other row of inserts in the radial direction. All insert cutting edges therefore together form a common, effective cutting tooth of the flat drilling tool.

When machining such structural components made of a titanium alloy, in particular for producing the pockets, a relatively long machining time is usually required.

SUMMARY

As one improvement over such known solutions as described above, embodiments of the present invention enable machining of structural components made of a titanium alloy to be accomplished in a shorter machining duration compared to conventional solutions. Such improvement is achieved according to the invention by a drilling tool and also by a process. The features and advantages indicated in respect of the drilling tool can also be transferred analogously to the process.

The drilling tool has a support, which extends along an axis of rotation in the axial direction and in which a plurality of cutting inserts are inserted at the end, these cutting inserts each having a horizontally running active insert cutting edge. An active insert cutting edge in this context is understood to mean an insert cutting edge which is in engagement with the component during the cutting operation. A flat drill is therefore formed by the horizontally running insert cutting edges.

The support furthermore has, in its face end center, a receptacle, in which a drilling tip is inserted. This is formed in particular as a reversibly exchangeable insert, which is held, for example, in a clamping manner and/or by a screw fastening between usually two retaining webs in a groove, which runs out at both ends in each case into a flute. The receptacle in the support and also the drilling tip are formed, in particular, in the manner described in EP 0 784 524 B1, unless described otherwise hereinbelow. A drilling tip of this type has at least two tip cutting edges extending outward in the radial direction from the drilling center or axis of rotation. These are adjoined in each case by at least one insert cutting edge. The tip cutting edges can in this case—considered in a plan view onto the end face—run in a curved manner or else rectilinearly in a strictly radial direction. The two tip cutting edges are preferably connected to one another by way of a chisel edge, and therefore an approximately S-shaped cutting edge of the drilling tip—considered in a plan view—is obtained overall.

By virtue of the provision of this additional drilling tip with a cutting edge which crosses the drilling center and therefore the axis of rotation, which are guided further in the radial direction in each case through the insert cutting edges, two effective cutting teeth are thereby formed, i.e., an effective cutting tooth on each side of the axis of rotation. An effective cutting tooth is understood to mean the sum total of the cutting edges which together provide an overall cutting edge extending continuously and without interruption over the radius of the drilling tool. In principle, more than two effective cutting teeth can also be formed. For this purpose, drilling tips having more than two tip cutting edges are then used.

On account of the at least two effective cutting teeth of the drilling tool, given the same feed rate per tooth, the overall feed rate during the component machining can therefore be increased at least by a factor of 2, so that considerably quicker machining is achieved. For the machining described here of a structural component preferably made of a titanium alloy, the feed rate is typically in the range of 0.08 to 0.14 mm per revolution and cutting tooth. The drilling tool as a whole typically has an overall diameter of approximately 60 to 80 mm.

In an expedient configuration, the tip cutting edges each have an outer cutting region, which likewise lies horizontally and at the same axial height as the active insert cutting edges. Together with the outer cutting regions, the insert cutting edges therefore form an effective cutting plane running in a horizontal plane transversely to the axis of rotation, such that an at least substantially flat drilled base is formed. In an expedient configuration, the drilling tip has a tip protruding in the axial direction merely in a central center region. This configuration has the particular advantage that the drilling tool is formed for producing blind holes with a planar drilled base and at the same time, on account of the horizontally running cutting edges, spot-drilling of surfaces oriented obliquely in relation to the axis of rotation is made possible without the risk of displacement of the drilling tool.

In order to achieve the most planar drilled base possible, the respective outer cutting region extends in the radial direction over at least 0.3 times and preferably over at least 0.4 times the radius of the drilling tip.

According to an expedient development, the outer cutting regions are adjoined in each case by a pitched cutting edge toward the axis of rotation, wherein the pitched cutting edges between them include an obtuse point angle in particular in the range of 120° to 150°. The point angle is preferably 140°. On account of this relatively obtuse angle, the axially frontmost point of the drilling tip is arranged only by a small axial height, preferably of at most 0.4 mm, in front of the outer cutting regions and therefore in front of the insert cutting edges. On account of this only small axial protrusion, a conical point is therefore worked into the blind hole base with a small depth only in the drill center region when drilling the blind hole. In the milling process which usually follows this, and in which the most planar base possible is to be produced, merely a small cutting removal therefore needs to be carried out in the axial direction.

Expediently, two cutting inserts spaced apart from one another in the circumferential direction are arranged to form a respective cutting tooth. These are spaced apart from one another in the direction of rotation or circumferential direction, for example, by an angle of rotation of 45° to 75°. The cutting inserts therefore form a leading cutting insert and a trailing cutting insert. In order to form a continuous effective cutting edge, they are arranged in an overlapping manner in the radial direction. An innermost leading cutting insert in turn is formed in an overlapping manner with the drilling tip in the radial direction, such that the active overall cutting edge of a cutting tooth is composed of the pitched cutting edge, the adjoining outer cutting region thereto, the insert cutting edge of the leading cutting insert and the insert cutting edge of the following cutting insert.

In a preferred development, each tip cutting edge is adjoined by two leading cutting inserts, which are arranged offset in relation to one another in the radial direction to form a gap, i.e., form a row in the radial direction. This gap is covered by the trailing cutting insert. It is preferable that two trailing cutting inserts are also provided per cutting tooth.

For effectively carrying away the chips which arise during the cutting operation, both the individual insert cutting edges and the respective tip cutting edges are respectively assigned a flute adjoining said cutting edges.

On account of the relatively low cutting speed of the tip cutting edge compared to the insert cutting edges, unbroken chips, which are known as floating chips or else coiled-up chips usually form on the tip cutting edge during the cutting operation. In contrast thereto, shorter, broken chipped parts form on the insert cutting edges. In order to avoid mixing of the floating chip material with the shorter chipped parts, the first flute adjoining the tip cutting edges is formed continuously from the tip cutting edge up to a run-out region in the support, without it merging into the respective second or third flute of the insert cutting edges. At the same time, it is expediently provided that the second and third flutes, which emanate from the insert cutting edges, merge into one another in the axial profile.

In order to ensure effective cooling and also to support the carrying away of chips, each cutting edge, i.e., each tip cutting edge and also each insert cutting edge, is assigned at least one coolant duct, which preferably emerges from the support on the end face.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

While various embodiments of the invention are illustrated, the particular embodiments shown should not be construed to limit the claims wherein like numerals are used for like elements throughout. It is anticipated that various changes and modifications may be made without departing from the scope of the invention.

DETAILED DESCRIPTION OF EXEMPLARY EMBODIMENTS OF THE INVENTION

Figures 1, 2:
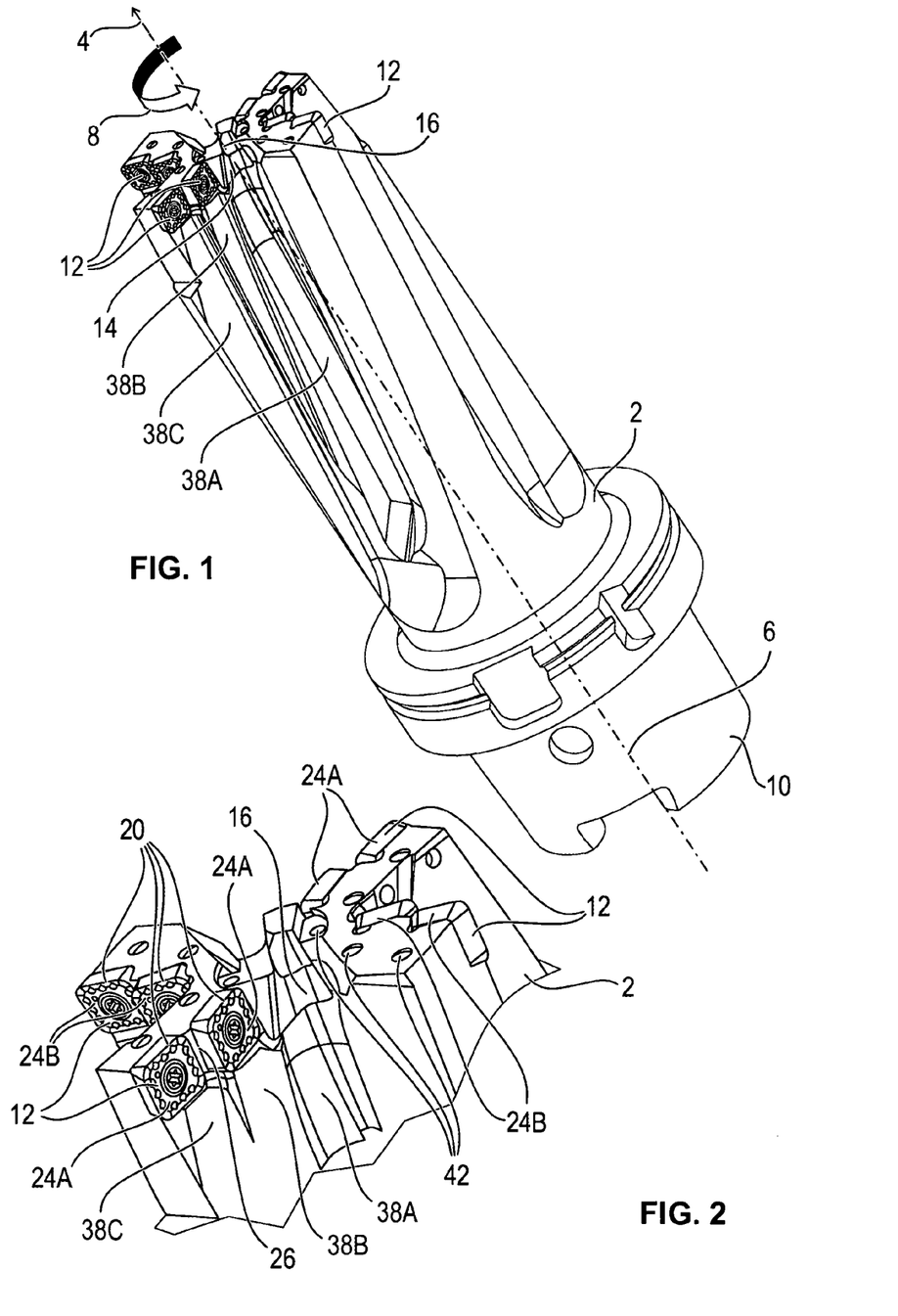
FIG. 1 shows a perspective illustration of a modular flat drilling tool in accordance with an example embodiment of the present invention.
FIG. 2 shows an enlarged view of the end region of the drilling tool of FIG. 1.

The drilling tool as shown in FIG. 1 is formed as a modular flat drilling tool, comprising a support 2 made, for example, without limitation, of a conventional tool steel. The support 2 extends in the axial direction 4 along an axis of rotation 6, around which it rotates during operation in the direction of rotation 8. At its rear end, the support 2 has a coupling 10, with which the support 2 is clamped into a machining machine.

A plurality of cutting inserts 12, which are formed in particular as quadratic indexable inserts, are fastened in a reversibly exchangeable manner to the front end of the support 2. As can be seen from the enlarged illustration as shown in FIG. 2, the end face of the support 2 has a central receptacle 14, into which a reversibly exchangeable drilling tip 16 is inserted as an insert part. This and also the way in which it is fastened in the receptacle 14 are—if no differing features are indicated hereinbelow—configured according to the configuration described in EP 0 784 524 B1. The drilling tip 16 is fastened on the bottom by a screw, which can be operated from behind via a central coolant duct 18 (cf. FIG. 6).

The front end face of the support 2 has a flat form and lies within a horizontal plane oriented perpendicularly to the axis of rotation 6. The individual cutting inserts 12 each have an active insert cutting edge 20, which likewise lie in a common horizontal plane.

In the exemplary embodiment, a total of eight cutting inserts 12 are fastened on the support 2, in each case four forming a group for forming an effective cutting tooth. The two groups are denoted in FIG. 4 by dashed lines 22A, 22B. Each group 22A, 22B has two leading cutting inserts 24A and two trailing cutting inserts 24B. The leading cutting inserts 24A and also the trailing cutting inserts 24B are each arranged alongside one another in a row in relation to one another, leaving free a gap 26 extending in the radial direction. The row of leading cutting inserts is arranged offset in terms of rotation approximately through an angle of rotation of between 45° and 75° in relation to the row of trailing cutting inserts. The two mutually corresponding rows of cutting inserts (leading and trailing) of the two groups 22A, 22B are in each case arranged offset in terms of rotation through 180° in relation to one another.

The gap 26 is covered in each case by the inner trailing cutting insert 24B. The trailing outer cutting insert 24B protrudes in the radial direction and defines the outer radius of the drilling tool. Overall, the drilling tool has a diameter in the range of, for example, 60 mm to 80 mm. The diameter of the drilling tip 16 is, for example, in the range of between 15 mm and 25 mm.

Figure 3:
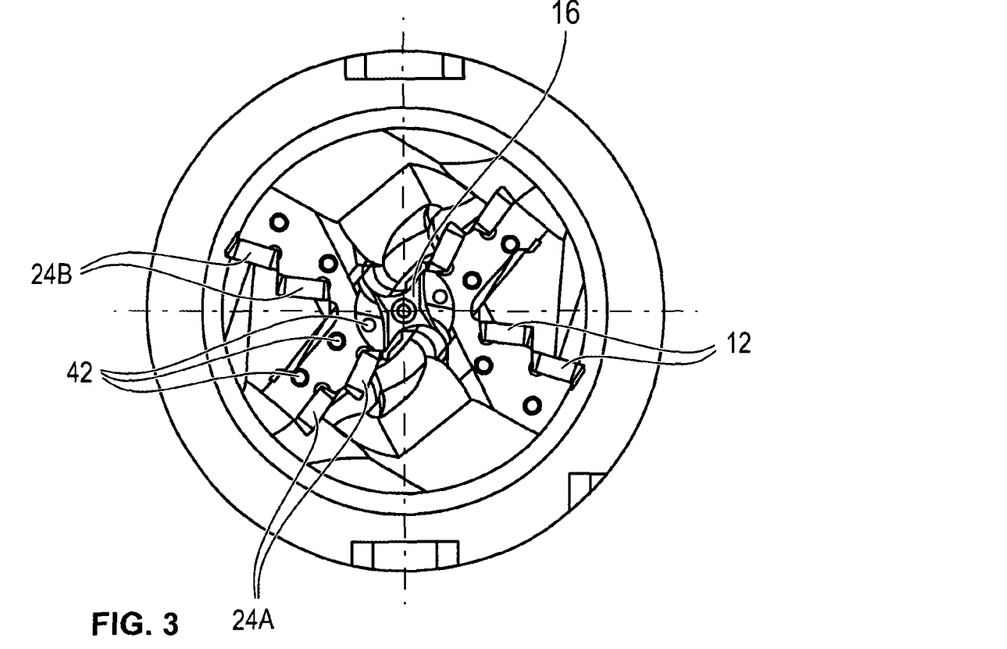
FIG. 3 shows a plan view onto the end face of the drilling tool of FIG. 1.
Figure 4:
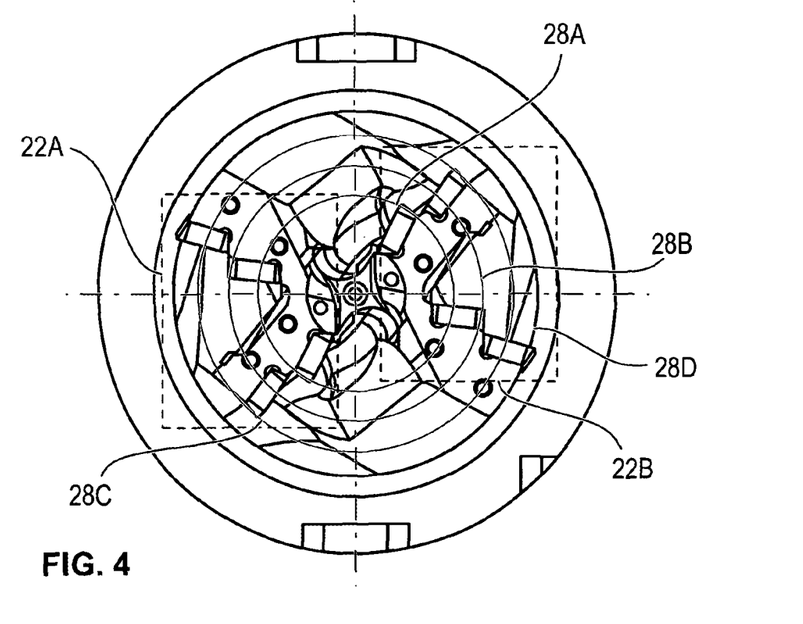
FIG. 4 shows the plan view of FIG. 3 with additional aid lines for identifying cutting circles of the individual cutting edges and also for identifying the different effective cutting teeth.

The radial position of the individual cutting inserts 12 is also apparent in particular from FIGS. 3 and 4, FIG. 4 showing for clarification the individual cutting circles 28A-D of the insert pairs assigned to one another in the two groups 22A, 22B. As can be gathered in particular from FIG. 4, the inserts which respectively correspond to one another in the two groups 22A, 22B, i.e., for example the inner leading cutting inserts 24A, each lie at the same radial position, offset in terms of rotation merely through 180° in relation to one another.

Figure 5A:
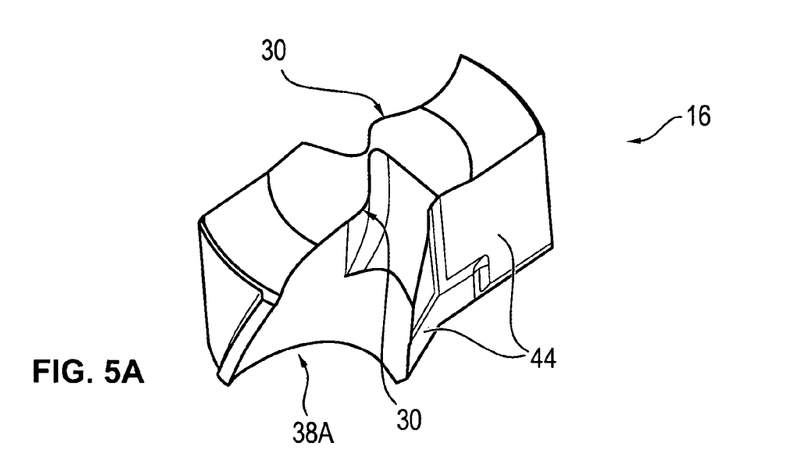
FIG. 5A shows a perspective illustration of a drilling tip in accordance with an example embodiment of the present invention.
Figure 5B:
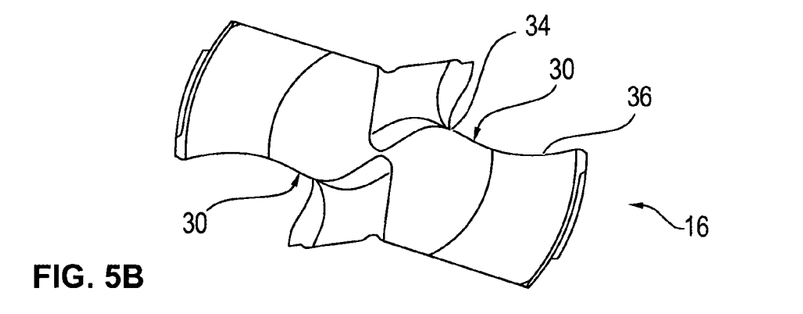
FIG. 5B shows a plan view onto the end face of the drilling tip of FIG. 5A.
Figure 5C:
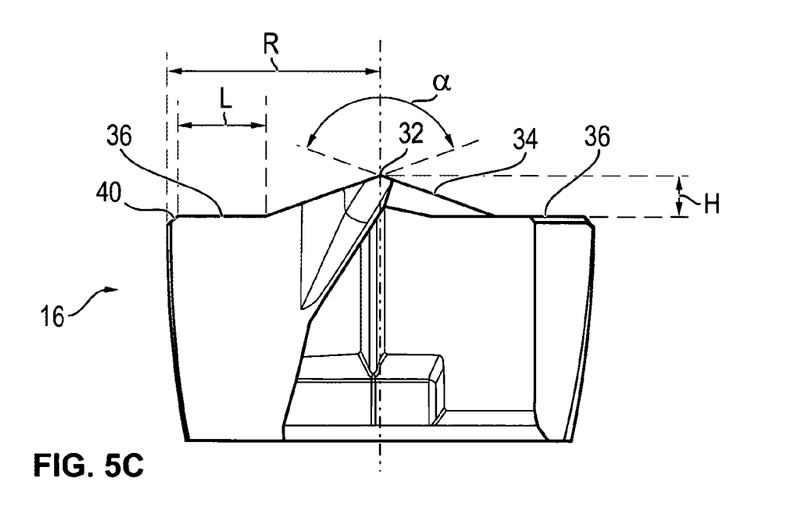
FIG. 5C shows a side view of the drilling tip of FIG. 5A.

The configuration of the drilling tip 16 is evident in particular from FIGS. 5A to 5C. The drilling tip 16 has an overall cutting edge which is curved in an approximately S-shaped manner and which is composed of two tip cutting edges 30, which are connected to one another by way of a chisel edge at a frontmost point 32. The tip cutting edges 30 in turn are each subdivided into a pitched cutting edge 34 and also an outer, horizontally running cutting region 36. The outer cutting region 36 lies in the same horizontal plane as the active insert cutting edges 20. The two pitched cutting edges 34 between them include an obtuse point angle α, which in the exemplary embodiment is about 140°. The frontmost point 32, which is formed by the chisel edge connecting the two pitched cutting edges 34, is spaced apart from the outer cutting regions 36 by a height H in the axial direction 4. This height is preferably approximately only 3 mm.

The outer cutting region 36 extends in each case over a radial length l, which, in the exemplary embodiment, corresponds approximately to 0.4 times the radius R of the drilling tip 16.

As can be gathered in particular from FIG. 5A, a first flute 38A adjoining the respective tip cutting edge 30 is already formed in the drilling tip 16 and is continued further in the support 2. The respective tip cutting edge 30 ends radially outwardly in each case at a cutting bevel 40. This connects the tip cutting edge 30 to a secondary cutting edge, which runs along the flute 38A and is adjoined by a supporting bevel (FIG. 5A) on the back of the drill.

Since floating chips form on the tip cutting edges 30 when machining a titanium alloy, special precautions are provided for effectively carrying away chips. Thus, the first flute 38A runs continuously from the tip cutting edge up to a rear run-out region on the support 2. In addition, the individual cutting inserts 12 are each assigned further flutes 38B, 38C, which are each formed in the support 2. The first flute 38A is guided separated over its stated length from the further flutes 38B, 38C. Broken short chips are usually present in the further flutes 38B, 38C. For effectively carrying away chips, the first flute 38A is surface-treated in the region of the support 2 and has a better surface quality than the further flutes 38B, 38C. In particular, the first flute 38A is ground, whereas the further flutes 38B, 38C are not subjected to any grinding operation during production of the support 2.

As can be gathered furthermore in particular from FIG. 2, coolant ducts 42 emerge from the end of the support 2. In this respect, each cutting insert 12 is assigned a coolant duct 42. Each tip cutting edge 30 of the drilling tip 16 is also assigned a coolant duct 42 in the support 2. These outlet points of the coolant ducts 42 are fed from the central coolant duct 18, from which the coolant ducts 42 emanate in the manner of boreholes, as can be seen in particular with reference to FIG. 6.

Figure 6:
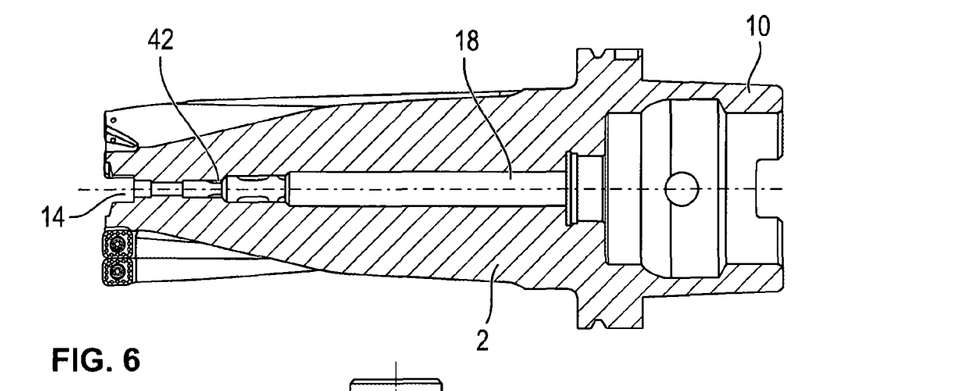
FIG. 6 shows a sectional view through the drilling tool of FIG. 1.

The receptacle 14, into which the drilling tip 16 is inserted, can also be seen in FIG. 6. This receptacle 14 is formed as a whole in the manner of a slot, in particular a clamping slot. The support 2 therefore has two webs, in particular clamping webs, which lie opposite one another and have corresponding contact surfaces, against which the drilling tip 16 comes to lie with corresponding contact surfaces 44 (FIG. 5A). As can be gathered in particular from FIG. 5A, the lateral contact surfaces of the drilling tip 16 have an angled (obtuse angle) form, as a result of which an accurate centering of the drilling tip 16 is achieved.

Figure 7:
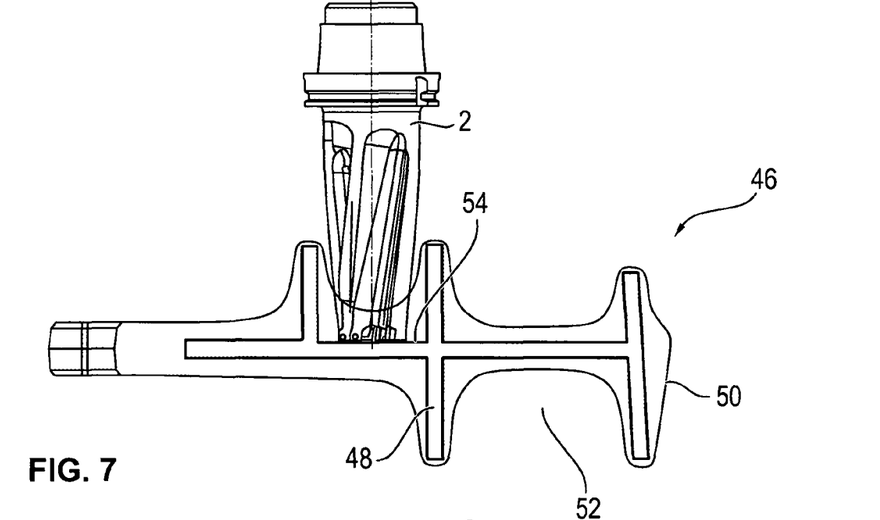
FIG. 7 shows the drilling tool of FIG. 1 together with a structural component for illustrating a machining process in accordance with an example embodiment of the present invention.

To explain the machining process, FIG. 7 shows in a schematic illustration a structural component 46 having a frame structure, which is formed by individual frame webs 48 in the final state. In the exemplary embodiment, the structural component 46 consists of a titanium alloy and is provided as a forged part. The outer contour 50 exists after the forging operation requires post-machining. First of all, a blind hole is produced between two frame webs 48 by means of the drilling tool. Then, a milling cutter (not shown in more detail here) is inserted into said blind hole in a second machining step, and then forms the desired contour of a pocket 52 between two frame webs 48. The pocket here has a planar pocket base 54.

A particular advantage of the flat drilling tool described here can be seen in the fact that overall two effective cutting teeth are formed by the combination of the cutting inserts 12 with the drilling tip 16, and therefore the machining speed increases considerably. Owing to the configuration with the horizontally running outer cutting regions 36, the most planar drilled base possible is additionally formed. A small conical point is produced in the component 46 merely in the central center region. This is in the range of only a few mm, however. To produce a planar pocket base 54, the milling cutter is therefore merely adjusted in the axial direction by the height H for further removal by cutting. At the same time, centered guidance of the drilling tool given a planar component surface is ensured owing to the tip at the frontmost point 32. At the same time, defined drilling is made possible by the horizontally running active insert cutting edges 20 even given curved or obliquely inclined component surfaces, without the drilling tool being laterally detached.

Compared to the prior art, such as shown in FIG. 8, the configuration with the second effective cutting tooth is to be emphasized. In the prior art, the individual cutting inserts 12 are each arranged in groups in relation to one another, these groups being positioned offset in terms of rotation approximately through 180° in relation to one another. The cutting inserts 12 in a group are in each case placed in a row in relation to one another in the radial direction to form a respective gap 26. The respective gap 26 is covered in each case by a cutting insert 12 in the other group. Merely a common cutting tooth is therefore formed by the combination of all cutting inserts 12.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

The description of the embodiment or embodiments is believed, at the time of the filing of this patent application, to adequately describe the embodiment or embodiments of this patent application. However, portions or all of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

We claim:

1. A drilling tool for machining structural components made of a titanium alloy, the drilling tool comprising:
    a support, which extends along an axis of rotation in the axial direction, the support having an end face with a receptacle disposed centrally therein;
    a plurality of cutting inserts inserted at the end face in a manner that forms a flat drill, each cutting insert having an active insert cutting edge extending transversely to the axial direction in a common plane in the horizontal direction; and
    wherein each active insert cutting edge extends along a major dimension associated with each cutting insert, when viewed with respect to the common plane;
    a drilling tip disposed in the receptacle and having at least two tip cutting edges, the tip cutting edges extending outward from the axis of rotation and being adjoined in each case by at least one active insert cutting edge,
    wherein the tip cutting edges each have an outer cutting region which extends transversely to the axial direction and which lies at the same axial height as the active insert cutting edges.

2. The drilling tool of claim 1 wherein the drilling tip has an outer radius and wherein the outer cutting region extends in the radial direction over at least 0.4 times the outer radius.

3. The drilling tool of claim 1 wherein each outer cutting region is adjoined by a pitched cutting edge toward the axis of rotation, and wherein the pitched cutting edges include a point angle in the range of 120° to 150°.

4. The drilling tool of claim 1 wherein the drilling tip has a frontmost point, lying on the axis of rotation, which protrudes in the axial direction by a height of at most 0.4 mm beyond the active insert cutting edges.

5. The drilling tool of claim 1 wherein each tip cutting edge is assigned at least a leading cutting insert and a trailing cutting insert, which are offset in relation to one another in an overlapping manner in the radial direction.

6. The drilling tool of claim 5 wherein each tip cutting edge is assigned two leading cutting inserts, which are spaced apart from one another in the radial direction by a gap, which is covered by the trailing cutting insert in the radial direction.

7. The drilling tool of claim 1 wherein the support includes a plurality of flutes running in the support respectively, each flute adjoining a respective one of the tip cutting edges or the insert cutting edges.

8. The drilling tool of claim 7, wherein the flutes adjoining the tip cutting edges have a higher surface quality than the flutes adjoining the insert cutting edges.

9. The drilling tool of claim 7, wherein the flutes adjoining the tip cutting edges run separated over their entire length from the flutes adjoining the insert cutting edges.

10. The drilling tool of claim 1, wherein each cutting edge is respectively assigned at least one coolant duct emerging in particular on the end face.

11. A process for machining a component, the process comprising forming a blind hole with the aid of the drilling tool of claim 1.

12. The process of claim 11 further comprising:
    inserting a milling cutter into the drilled blind hole; and
    milling a pocket having a planar pocket base out of the component;
    wherein, to this end, a material removal is performed proceeding from a drilled base of the blind hole in the axial direction, the depth of which material removal corresponds to a height by which a frontmost point of the drill tip protrudes beyond the insert cutting edges.

13. The method of claim 11, wherein forming the blind hole is performed at a feed rate of between 0.08 and 0.14 mm per revolution and cutting tooth.

14. The drilling tool of claim 1, wherein the plurality of cutting inserts are arranged to form at least two effective cutting teeth.

15. The drilling tool of claim 14, wherein each cutting tooth comprises a row of leading cutting inserts and a row of trailing cutting inserts, the row of trailing cutting inserts being rotationally offset from the row of leading cutting inserts.

16. The drilling tool of claim 15, wherein the row of leading cutting inserts is rotationally offset from the row of trailing cutting inserts by an angle between 45° and 75°.

17. The drilling tool of claim 15, wherein each row of leading cutting inserts and each row of trailing cutting inserts comprises two of the plurality of cutting inserts.

18. The drilling tool of claim 15, wherein:
the row of leading cutting inserts of a first tooth is rotationally offset from the row of leading cutting inserts of a second tooth by 180°; and
the row of trailing cutting inserts of the first tooth is rotationally offset from the row of trailing cutting inserts of the second tooth by 180°.

19. The drilling tool of claim 1, wherein the drilling tip has lateral contact surfaces having an obtuse angled form.

20. The drilling tool of claim 1, wherein each active insert cutting edge extends along a radial direction with respect to a longitudinal axis of the drilling tool.

21. A drilling tool for machining structural components made of a titanium alloy, the drilling tool comprising:
a support, which extends along an axis of rotation in the axial direction, the support having an end face with a receptacle disposed centrally therein;
a plurality of cutting inserts inserted at the end face in a manner that forms a flat drill, each cutting insert having an active insert cutting edge extending transversely to the axial direction in a common plane in the horizontal direction; and
a drilling tip disposed in the receptacle and having at least two tip cutting edges, the tip cutting edges extending outward from the axis of rotation and being adjoined in each case by at least one active insert cutting edge,
wherein the tip cutting edges each have an outer cutting region which extends transversely to the axial direction and which lies at the same axial height as the active insert cutting edges,
wherein the plurality of cutting inserts are arranged to form at least two effective cutting teeth,
wherein each cutting tooth comprises a row of leading cutting inserts and a row of trailing cutting inserts, the row of trailing cutting inserts being rotationally offset from the row of leading cutting inserts, and
wherein the row of leading cutting inserts is rotationally offset from the row of trailing cutting inserts by an angle between 45° and 75°.

22. A drilling tool for machining structural components made of a titanium alloy, the drilling tool comprising:
a support, which extends along an axis of rotation in the axial direction, the support having an end face with a receptacle disposed centrally therein;
a plurality of cutting inserts inserted at the end face in a manner that forms a flat drill, each cutting insert having an active insert cutting edge extending transversely to the axial direction in a common plane in the horizontal direction; and
a drilling tip disposed in the receptacle and having at least two tip cutting edges, the tip cutting edges extending outward from the axis of rotation and being adjoined in each case by at least one active insert cutting edge,
wherein the tip cutting edges each have an outer cutting region which extends transversely to the axial direction and which lies at the same axial height as the active insert cutting edges,
wherein the plurality of cutting inserts are arranged to form at least two effective cutting teeth,
wherein each cutting tooth comprises a row of leading cutting inserts and a row of trailing cutting inserts, the row of trailing cutting inserts being rotationally offset from the row of leading cutting inserts,
wherein the row of leading cutting inserts of a first tooth is rotationally offset from the row of leading cutting inserts of a second tooth by 180°, and
wherein the row of trailing cutting inserts of the first tooth is rotationally offset from the row of trailing cutting inserts of the second tooth by 180°.

* * * * *